Patented Feb. 9, 1937

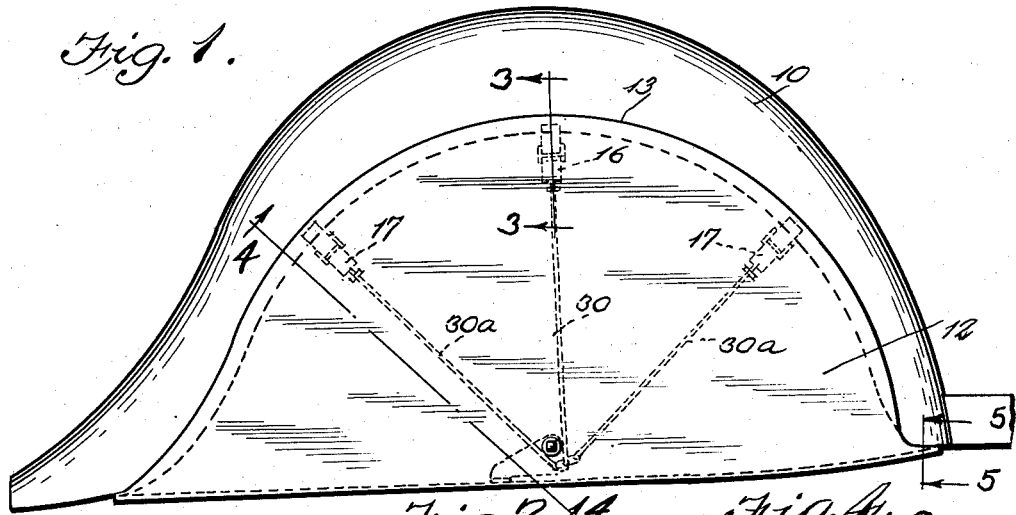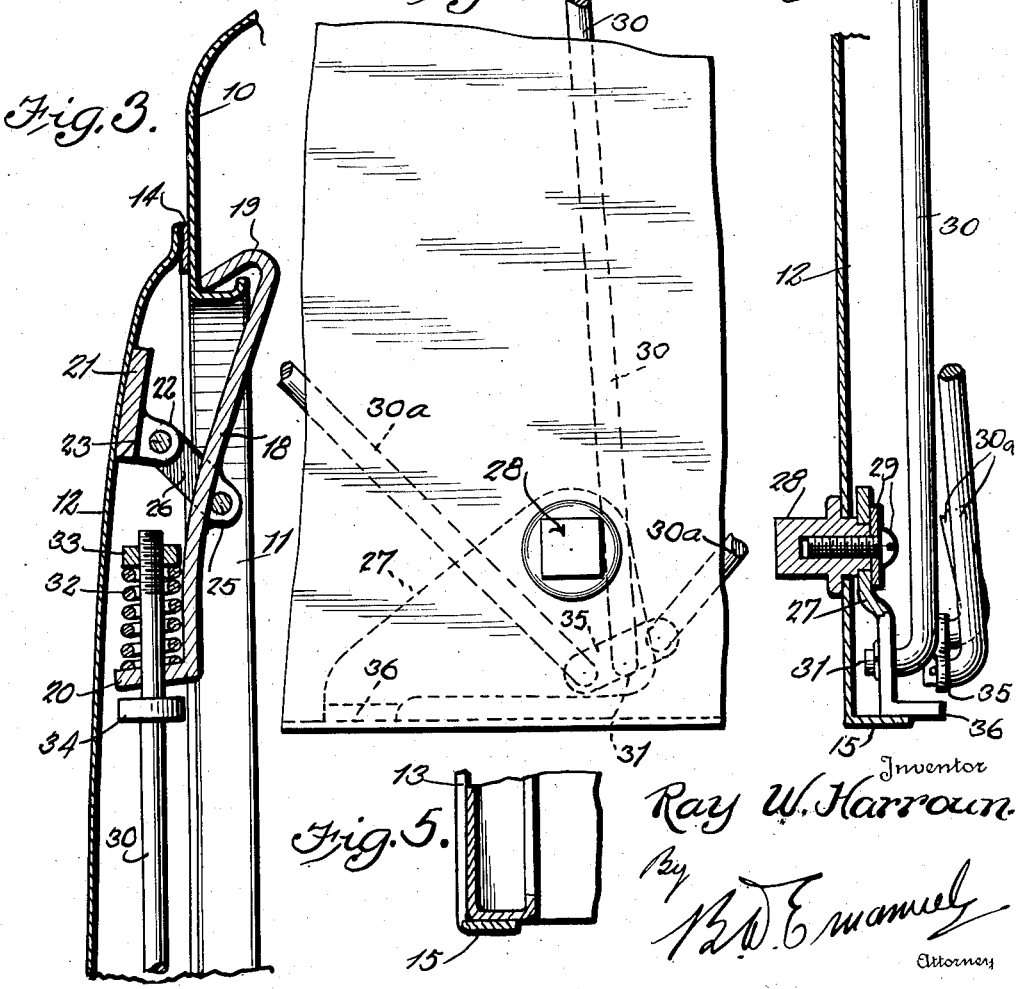

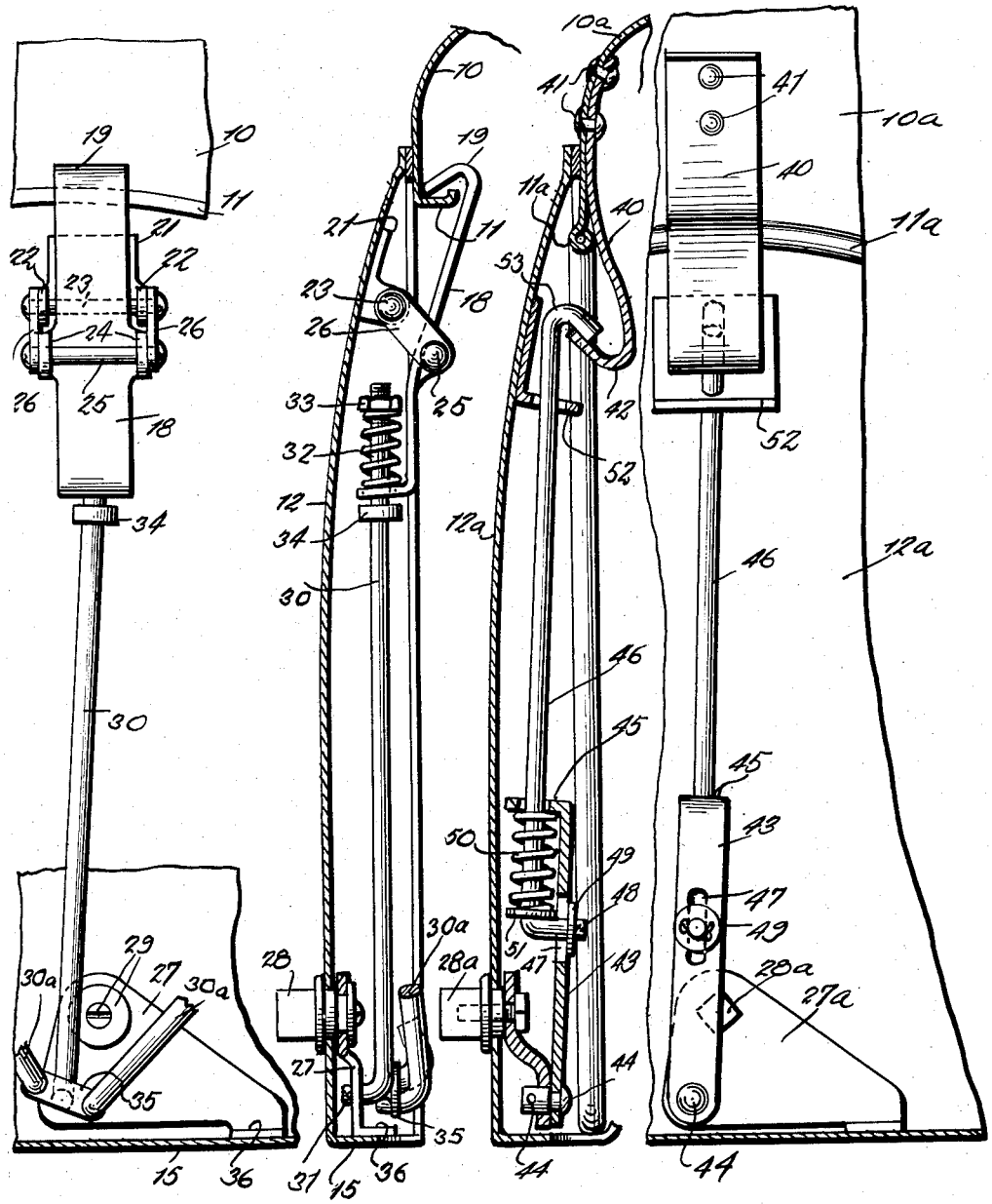

2,070,230

UNITED STATES PATENT OFFICE 2,070,230

WHEEL GUARD

Ray W. Harroun, Detroit, Mich., assignor to Aero-Style Corporation, Indianapolis, Ind., a corporation of Indiana Application May 15, 1934, Serial No. 725,783

12 Claims. (Cl. 280—153)

This invention relates to certain new and useful improvements in wheel guards.

A recent development in the automobile industry involves a wheel fender comprising a side plate or skirt portion that overlies the upper half of the wheel and constitutes a guard, such devices being of permanent construction and it is the primary object of this invention to design a wheel guard in simulation of such construction which may be termed demountable or removably associated with the ordinary fender for disengagement therefrom when desired.

A further object of the invention is to provide a wheel guard of the foregoing character embodying a novel form of clamping mechanism carried by the guard wall for cooperation with the wheel fender for the rigid placement of the wheel guard relative to the fender.

A still further object of the invention is to provide a wheel guard carrying attaching members for association with a wheel fender wherein the attaching members are located at the inner side of the guard walls and are capable of manual operation at either the inner or outer side of the guard wall to effect placement thereof in position or removal from a wheel fender.

The invention further contemplates the use of tensioned latch members for attaching a wheel guard to a fender to compensate for variances in fender openings so that the guards may be of standard size for use with fenders of different sizes within a limited range.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an automobile wheel fender having the improved wheel guard attached thereto;

Figure 2 is an enlarged fragmentary side elevational view of the wheel guard showing the key block at the outer side of the guard for the operation of the latch members at the inner side of the guard;

Figure 3 is an enlarged detail sectional view taken on line 3—3 of Figure 1, showing a tensioned latch member at the inner side of the guard engaged with the lower flanged edge of a wheel fender;

Figure 4 is a detail sectional view taken on line 4—4 of Figure 1, showing the latch rod attached to the cam plate at the inner side of the guard and the key block carrying the cam plate projecting to the outer side of the guard;

Figure 5 is a detail sectional view taken on line 5—5 of Figure 1;

Figure 6 is a rear elevational view of one of the latch devices for attaching the guard to the wheel fender, the guard and fender being fragmentarily illustrated;

Figure 7 is a vertical sectional view of the guard with the latch device shown in elevation and operatively engaged with the fender;

Figure 8 is a fragmentary rear elevational view of another form of the invention showing the tensioning means for the latch device arranged adjacent the cam operating plate and a cooperating hook for the latch device carried by the fender; and Figure 9 is a vertical sectional view of the guard and fender shown in Figure 8.

The wheel guard may be referred to as demountable or removable and is adapted for association with the wheel fender 10 that is of conventional design, the fender overlying a wheel with the major portion of the latter exposed and said fender at its lower edge is provided with an inturned flange 11 shown in Figures 3 and 7 that can be rolled on a bead if desired.

The wheel guard 12 comprises a plate or wall having its upper edge 13 curved complementally to the lower curved flanged edge 11 of the fender 10 and is adapted to overlie the outer side of the fender with a felt strip 14 interposed between the guard and fender to prevent the marring of the surface of the latter. The guard wall 12 bulges outwardly and carries an inwardly directed bottom wall 15 that underlies opposite ends of the fender 10 as shown in Figure 1.

The devices for attaching the wheel guard 12 to the fender 10 include a main latch 16 and auxiliary latches 17 positioned as illustrated by dotted lines in Figure 1. Each latch includes a latch plate 18 having a hook 19 at its upper end and an apertured flange 20 at its lower end. The mounting for the latch plate 18 includes a block 21 secured to the inner face of the guard wall 12 adjacent its upper curved edge with a pair of spaced ears 22 carried by the block 21 for the support of a cross pin 23 and the latch plate 18 intermediate its ends carries a pair of side edge ears 24 for the support of a cross pin 25, the projecting ends of the pins 23 and 25 being connected by links 26.

A lever plate 27 is pivotally supported on the wall 12 of the guard adjacent its lower end and substantially midway the opposite ends of the bottom wall 15, the pivotal mounting for the lever plate 27 being shown more clearly in Figure 4 as comprising a key block 28 positioned at the outer side of the guard wall 12 and journalled in an opening in the wall with the lever plate 27 keyed to the inner end of the key block and retained in position thereon by means of the screw and washer combination 29. The connection between the latch plate 18 and the lever plate 27 includes a rod 30 having its lower end pivotally connected as at 31 to the lever plate 27 with the upper end thereof extending through the apertured flange 20 at the lower end of the plate 18, the end of the rod 30 above the flanged end 20 having a coil spring 32 surrounding the same and engaged with the flange with the upper end of the coil spring engaged by the nut 33 threaded upon the upper end of the rod 30. An abutment disk 34 carried by the rod 30 adjacent to and below the flanged end 20 of the latch plate 18 acts to move the latch plate upon its link connection with the block 21 for disengaging the hook 19 at the upper end of the latch plate from engagement with the flange 11 of the fender 10. The operating rod 30 for the main latch 16 is directly connected to the lever plate 27 while the laterally positioned auxiliary latches 17, each have an operating rod 30a associated therewith, with the lower ends of the rods 30a pivotally connected to a cross arm 35 carried by the lower end of the rod 30 as clearly shown in Figures 4, 6, and 7.

The lever plate 27 is of substantially triangular formation and is provided with an angle flange 36 at one corner thereof for abutting engagement with the bottom wall 15 of the guard wall when the latch members are clampingly engaged with the fender 10 and when so disposed, the operating rod 30 for the main latch member 16 has been moved past dead center as shown in Figure 6 with the spring 32 placed under tension to prevent accidental operation of the lever plate, and release of the latch members. With the hooks 19 of the latch plate 18 engaged with the flange edge 11 of the fender 10, pivotal movement of the lever 27 results in a downward pull upon the latch members 16 and 17 and upward movement of the guard wall 12, the latter being limited by the bottom wall 15 thereof engaging with the edge flanges of the fender 10 adjacent opposite ends thereof as shown in Figure 5 for clamping the wheel guard in position, further movement of the lever plate 27 placing the springs 32 under tension and causing the rod 30 to be shifted laterally of the lever plate pivot for retention of the parts in set position, movement of the lever plate 27 being limited by the corner flange 36 moving into engagement with the bottom wall 15 of the guard wall. The latch members may be operated from either side of the guard wall 12 by direct operation of the lever plate 27 at the inner side of the guard wall or the operation of the key block 28 at the outer side of the guard wall through the medium of a socket wrench or the like.

In the form of invention illustrated in Figures 8 and 9, the wheel fender 10a has a beaded or rolled edge 11a and has a series of hook plates 40 secured by means of rivets or the like 41 to the inner side of the fender 10a with the lower hooked ends 42 of the hook plates extending below the lower edge 11a of the fender. A lever plate 27a is pivotally mounted at the inner side of the lower end of the guard wall 12a by means of the key blocks 28a and the lever plate 27a has one end of an arm 43 pivoted thereto as at 44. An apertured angle flange 45 is carried by the upper end of the arm 43 and through which the rod 46 slidably extends, the arm 43 having a longitudinally extending slotted opening 47 therein intermediate its ends through which the lower angle end 48 of the rod 46 extends for the reception of a disk plate 49 to retain the angle end of the rod in position relative to the arm 43. The coil spring 50 surrounds the rod 46 between the angle flange 45 of the arm 43 and an abutment disk 51 on the rod adjacent the lower angle end 48. The upper end of the rod 46 extends through an apertured guide 52 carried by the inner face of the guard wall 12a and is provided upon its upper end with a hook 53 for engagement with the hook 42 at the lower end of the hook plate 40. In this form of the invention, the means for tensioning the rod 46 is located adjacent the lower end thereof and in proximity of the lever plate 27a and when the latch device is in clamping position, the pivotal connection 44 between the arm 43 and lever plate 27a is shifted laterally of the lever plate pivot 28a for retaining the latch devices against accidental displacement.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In a device of the class described, a substantially semi-circular closure for the side opening of a wheel fender, the ends of the closure adapted to be engaged with the underside of the ends of the fender and the upper curved edge slidably overlapping the substantially vertical outside surface of the fender, and means carried by the closure intermediate the ends thereof and adapted to be engaged with the upper edges of the fender in spaced relation to the ends for maintaining snug engagement between the fender and closure for removably securing the latter in position.

2. In a device of the class described, a substantially semi-circular closure for the side opening of a wheel fender, said closure adapted to be engaged with the underside of the lower ends of the fender and having its upper edge slidably overlapping the substantially vertical exposed surface of the fender, adjacent said opening, and means carried by the closure intermediate the ends thereof and adapted to be engaged with the upper edge of the fender in spaced relation to the ends for moving the closure in an upward and inward direction to effect binding engagement between the closure and fender.

3. In a device of the class described, a guard wall adapted to close the side opening of an automobile wheel fender, said guard wall adapted to overlie the substantially vertical exposed surface of the curved edge of the fender and be disposed laterally of the fender for slidable overlapping movement relative to the fender, extensions at the lower ends of the guard wall extending beneath the fender for engagement therewith and means carried by the guard wall engageable with the fender for moving the guard wall in an upward and inward direction towards the fender for bindingly securing the guard wall in position on the fender.

4. A wheel guard wall adapted for attachment to a wheel fender having a curved edge, said guard wall having an upper curved edge complemental to the curved edge of the fender with the lower ends of the guard extending beneath the fender and the upper edge of the guard slidably overlapping the substantially vertical outer face of the fender, and tensioned latch connections between the guard wall and fender for normally influencing the guard wall in an inward direction of movement to effect snug engagement between the guard wall and fender.

5. In a device of the class described, a wheel guard wall adapted to close the side opening of a wheel fender, the lower ends of the guard wall adapted to be engaged with the under side of the fender and the upper edge slidably overlapping a substantially vertical exposed surface of the fender and means operatively associated with the guard wall and fender for maintaining snug engagement between the fender and guard wall for removably securing the latter in position.

6. In a device of the class described, a wheel guard wall adapted to close the side opening of a wheel fender, said guard wall having means adapted to be engaged with the undersides of the front and rear ends of the fender and having its upper edge adapted to slidably overlap a substantially vertical exposed surfacing of the fender, and means carried by the guard wall intermediate the ends thereof and adapted to be engaged with the fender at spaced points above the lower ends of the fender and in spaced relation to the ends of the fender for moving the guard wall in an upward and inward direction to effect binding engagement between the guard wall and fender.

7. In a device of the class described, a guard wall adapted to close the side opening of an automobile wheel fender, with the upper edge of the guard wall adapted to overlap a substantially vertical exposed surface of the outside edge of the fender opening, tensioned latch connections between the guard wall and fender for normally influencing the guard wall in an upward and inward direction of movement, and stop means adjacent the ends of the guard wall adapted to be positioned beneath the underside of the fender for effecting a predetermined alignment of the lower edge of the guard wall with the fender.

8. In a device of the class described, a guard wall adapted to close the side opening of an automobile wheel fender, with the upper edge of the wall adapted to overlap a substantially vertical exposed surface of the outside edge of the fender opening, resilient means attached to the inside of the guard wall adapted to overlap the inside edge of the fender opening for engagement with the fender to effect snug engagement between the upper edge of the guard wall and the fender, and means at the lower end of the guard wall underlying the fender for effecting alinement of the lower edge of the guard wall and fender.

9. In a device of the class described a guard wall adapted to close the side opening of an automobile wheel fender, with the upper edge of the guard wall adapted to overlap a substantially vertical exposed surface of the outside edge of the fender opening, resilient means attached to the inside of the guard wall adapted to overlap the edge of the fender opening for engagement with the fender to effect snug engagement between the upper edge of the guard wall and the fender, and stop means adjacent the ends of the guard wall adapted to be positioned beneath the lower ends of the fender for effecting a predetermined alignment of the lower edge of the guard wall with the fender.

10. In a device of the class described, a guard wall adapted to close the side opening of an automobile wheel fender, tensioned latch connections between the guard wall and the fender for effecting a snug overlapping engagement with a substantially vertical exposed surface of the outside edge of the fender opening, and stop means adjacent the ends of the guard wall adapted to extend beneath the underside of the fender and cooperating with the fender for effecting a predetermined alignment of the lower edge of the guard wall with the fender.

11. In a device of the class described wherein, a wheel is adapted to be dismounted through a side opening formed in a fender wall, a guard wall adapted to close the opening, said guard wall having an upper curved edge complementary to and overlapping a substantially vertical exposed surface of the outside of the edge of the fender surrounding said opening, complementary locating means adjacent the lower ends of the guard wall and opening and located beneath the opening to effect a predetermined alignment of the lower edge of the guard wall with the lower ends of said opening, and tensioned latching means for maintining said complementary locating means in snug engagement, and effecting inward movement of the guard wall towards the opening to cause engagement of the overlapping upper curved edge of the guard wall and the outer edge of the opening.

12. In a device of the class described, wherein a wheel is adapted to be mounted and dismounted through a side opening formed in the depending outer wall of a fender, a guard wall adapted to close the opening and having an upper edge complementary to and overlapping a substantially vertical exposed surface of the outside of the edge of the fender surrounding said opening, complementary engagement means adjacent the lower ends of the guard wall and fender wall having the opening and extending beneath the edge of the opening to effect a predetermined alignment of the lower edge of the guard wall with the lower ends of the opening, and means carried by the guard wall adapted to be detachably engaged with the edge of the fender wall having the opening for retaining the guard wall in position to close the opening.

RAY W. HARROUN.